United States Patent
Chen et al.

(10) Patent No.: US 11,144,828 B2
(45) Date of Patent: Oct. 12, 2021

(54) TRAINING TASK OPTIMIZATION SYSTEM, TRAINING TASK OPTIMIZATION METHOD AND NON-TRANSITORY COMPUTER READABLE MEDIUM FOR OPERATING THE SAME

(71) Applicant: HTC Corporation, Taoyuan (TW)

(72) Inventors: Chun-Yen Chen, Taoyuan (TW);
Shang-Xuan Zou, Taoyuan (TW);
Jui-Lin Wu, Taoyuan (TW);
Chun-Nan Chou, Taoyuan (TW);
Kuan-Chieh Tung, Taoyuan (TW);
Chia-Chin Tsao, Taoyuan (TW);
Ting-Wei Lin, Taoyuan (TW);
Cheng-Lung Sung, Taoyuan (TW);
Edward Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 744 days.

(21) Appl. No.: 16/004,449

(22) Filed: Jun. 11, 2018

(65) Prior Publication Data

US 2018/0357541 A1 Dec. 13, 2018

Related U.S. Application Data

(60) Provisional application No. 62/517,189, filed on Jun. 9, 2017.

(51) Int. Cl.
*G06K 9/00* (2006.01)
*G06K 9/62* (2006.01)
(Continued)

(52) U.S. Cl.
CPC ............... *G06N 3/08* (2013.01); *G06F 9/46* (2013.01); *G06N 3/04* (2013.01); *G06N 3/063* (2013.01)

(58) Field of Classification Search
CPC . G06N 3/08; G06N 3/04; G06N 3/063; G06F 9/5016; G06F 9/46
(Continued)

(56) References Cited

U.S. PATENT DOCUMENTS

| 10,262,390 B1* | 4/2019 | Sun ....................... G06F 9/4881 |
| 2015/0371132 A1* | 12/2015 | Gemello ............... H01L 29/785 |
| | | 706/20 |

(Continued)

FOREIGN PATENT DOCUMENTS

| CN | 1857001 A | 11/2006 |
| CN | 103699440 A | 4/2014 |

(Continued)

OTHER PUBLICATIONS

Morishita M., et al., (Jun. 19, 2017) "An Empirical Study of Mini-Batch Creation Strategies for Neural Machine Translation" Retrieved from https://arxiv.org/abs/1706.05765 (Year: 2017).*

(Continued)

*Primary Examiner* — Brandon S Cole
(74) *Attorney, Agent, or Firm* — CKC & Partners Co., LLC (57) ABSTRACT

A training task optimization system includes a processor. The processor is configured to receive training environment information of a training task. The training environment information at least carries information corresponding to training samples in the training task. The processor is configured to calculate a memory distribution for the training task based on memory factors, the training samples and a neural network, and select a mini-batch size that is fit to the memory distribution. In response to the training environment information, the processor is configured to output the mini-batch size for execution of the training task.

10 Claims, 7 Drawing Sheets

(51) Int. Cl.
  *G06N 20/00* (2019.01)
  *G06N 3/08* (2006.01)
  *G06N 3/04* (2006.01)
  *G06N 3/063* (2006.01)
  *G06F 9/46* (2006.01)
(58) Field of Classification Search
  USPC .................................................... 706/1–62
  See application file for complete search history.

(56) References Cited

U.S. PATENT DOCUMENTS

| | | | |
|---|---|---|---|
| 2017/0098171 A1 | 4/2017 | Kumar et al. | |
| 2017/0308789 A1* | 10/2017 | Langford | G06N 3/08 |
| 2018/0130324 A1* | 5/2018 | Yu | G06K 9/00295 |
| 2018/0189638 A1* | 7/2018 | Nurvitadhi | G06N 3/0445 |
| 2018/0357541 A1* | 12/2018 | Chen | G06F 9/5016 |
| 2021/0141355 A1* | 5/2021 | Duan | G05B 19/042 |

FOREIGN PATENT DOCUMENTS

| | | |
|---|---|---|
| CN | 105516242 A | 4/2016 |
| CN | 105808339 A | 7/2016 |
| CN | 106445676 A | 2/2017 |
| TW | 201424292 A | 6/2014 |
| TW | 201701199 A | 1/2017 |
| WO | 2016119429 A1 | 8/2016 |

OTHER PUBLICATIONS

Kotsiantis S., et al., (2006) "Machine learning: a review of classification and combining techniques" Retrieved from https://link.springer.com/article/10.1007/s10462-007-9052-3#citeas (Year: 2006).*
Corresponding Taiwan office action dated Mar. 29, 2019.
Corresponding Chinese office action dated May 8, 2020.
Edward Chang et al., "2D BubbleUp: Managing parallel Disks for Media Servers", The 5th International Conference of Foundations of Data Organization (FODO'98), Nov. 12-13, 1998, pp. 1-25. https://www.researchgate.net/publication/220791749_2D_BubbleUp_Managing_Parallel_Disks_for_Media_Servers.
Zhiyuan Liu et al., "PLDA+: Parallel Latent Dirichlet Allocation with Data Placement ad Pipeline Processing", ACM Transactions on Intelligent Systems and Technology (TIST),vol. 2 Issue 3, Apr. 2011, Article No. 26. https://dl.acm.org/citation.cfm?id=1961198.
Makhorin, Andrew, "GLPK (GNU Linear Programming Kit)" https://www.gnu.org/software/glpk/.
Zhongyang Zheng et al., "SpeeDO: Parallelizing Stochastic Gradient Descent for Deep Convolutional Neural Network", NIPS Workshop on Machine Learning Systems, Dec. 12, 2015, pp. 1-6.
"CS231n: Convolutional Neural Networks for Visual Recognition.", A course, instructors: Fei-Fei Li, Justin Johnson, Serena Yeung. http://cs231n.stanford.edu/.
Martin Abadi et al.,"TensorFlow: Large-Scale Machine Learning on Heterogeneous Distributed Systems.", Tensor Flow White Paper, 2015, pp. 1-19. https://www.tensorflow.org/about/bib.
Gene M. Amdahl, "Validity of the single processor approach to achieving large scale computing capabilities", spring joint computer conference, 1967, pp. 483-485.
Soheil Bahrampour et al., "Comparative Study of Deep Learning Software Frameworks", Mar. 30, 2016, pp. 1-9. https://arxiv.org/abs/1511.06435.
Yoshua Bengio, "Practical recommendations for gradient-based training of deep architectures", Version 2, Sep. 16, 2012, pp. 1-33. https://arxiv.org/abs/1206.5533.
Jianmin Chen et al., "Revisiting Distributed Synchronous SGD", Version 3, Mar. 21, 2017, pp. 1-10. https://arxiv.org/abs/1604.00981.
Tianqi Chen et al., "MXNet: A Flexible and Efficient Machine Learning Library for Heterogeneous Distributed Systems", Version 1, Dec. 3, 2015, pp. 1-6. https://arxiv.org/abs/1512.01274.

Sharan Chetlur et al., "cuDNN: Efficient Primitives for Deep Learning", Version 3, Dec. 18, 2014, pp. 1-9. https://arxiv.org/abs/1410.0759.
Trishul Chilimbi et al., "Project Adam: Building an Efficient and Scalable Deep Learning Training System", 11th USENIX Symposium on Operating Systems Design and Implementation (OSDI '14), Oct. 6-8, 2014 pp. 571.-582.
Ronan Collobert et al., "Torch7: A Matlab-like Environment for Machine Learning", Big Learning 2011 : NIPS 2011 Workshop on Algorithms, Systems, and Tools for Learning at Scale, Dec. 16, 2011, pp. 1-6. http://publications.idiap.ch/index.php/publications/show/2240.
Jason Cong et al., "Minimizing Computation in Convolutional Neural Networks", ICANN 2014, pp. 281-290.
Jeffrey Dean et al., "Large Scale Distributed Deep Networks", NIPS'12 Proceedings of the 25th International Conference on Neural Information Processing Systems—vol. 1, Dec. 3-6, 2012, pp. 1223-1233. https://dl.acm.org/citation.cfm?id=2999271.
Jia Deng et al., "ImageNet: A Large-Scale Hierarchical Image Database", 2009 IEEE Conference on Computer Vision and Pattern Recognition, Jun. 20-25, 2009, pp. 248-255.
John Duchi et al., "Adaptive Subgradient Methods for Online Learning and Stochastic Optimization", Journal of Machine Learning Research, vol. 12, Feb. 1, 2011, pp. 2121-2159. https://dl.acm.org/citation.cfm?id=2021068.
Ahmed Elgohary et al., "Compressed Linear Algebra for Large-Scale Machine Learning", Proceedings of the VLDB Endowment, vol. 9 Issue 12, Aug. 2016, pp. 960-971 https://dl.acm.org/citation.cfm?id=2994515.
Alex Krizhevsky et al., "One weird trick for parallelizing convolutional neural networks", version 2, Apr. 26, 2014, pp. 1-7. https://arxiv.org/abs/1404.5997.
Marc'Aurelio Ranzato et al., "Factored 3-Way Restricted Boltzmann Machines for Modeling Natural Images", 13th International Conference on Artificial Intelligence and Statistics (AISTATS) 2010, vol. 9, 2010, pp. 621-628. http://proceedings.mlr.press/v9/ranzato10a.html.
Alex Krizhevsky et al., "ImageNet Classification with Deep Convolutional Neural Networks", NIPS'12 Proceedings of the 25th International Conference on Neural Information Processing Systems—vol. 1, Dec. 3-6, 2012, pp. 1097-1105. https://dl.acm.org/citation.cfm?id=2999257.
Andrew Lavin et al., "Fast Algorithms for Convolutional Neural Networks", version 2, Nov. 10, 2015, pp. 1-9. https://arxiv.org/abs/1509.09308.
Yann LeCun et al., "Gradient-Based Learning Applied to Document Recognition", Proceedings of the IEEE, vol. 86, Issue 11, Nov. 1998, pp. 1-46.
Mu Li et al., "Scaling Distributed Machine Learning with the Parameter Server", OSDI'14 Proceedings of the 11th USENIX conference on Operating Systems Design and Implementation, Oct. 6-8, 2014, pp. 583-598. https://dl.acm.org/citation.cfm?id=2685095.
Michael Mathieu et al., "Fast Training of Convolutional Networks through FFTs", version 5, Mar. 6, 2014, pp. 1-9. https://arxiv.org/abs/1312.5851.
Feng Niu et al., "Hogwild! A Lock-Free Approach to Parallelizing Stochastic Gradient Descent", version 2, Nov. 11, 2011, pp. 1-22. https://arxiv.org/abs/1106.5730.
Shaohuai Shi et al., "Benchmarking State-of-the-Art Deep Learning Software Tool", version 7, Feb. 17, 2017, pp. 1-14. https://arxiv.org/abs/1608.07249.
Christian Szegedy et al., "Inception-v4, Inception-ResNet and the Impact of Residual Connections on Learning", version 2, Aug. 23, 2016, pp. 1-12. https://arxiv.org/abs/1602.07261.
Nicolas Vasilache et al., "Fast Convolutional Nets With fbfft: A GPU Performance Evaluation", Published as a conference paper at ICLR 2015, Apr. 10, 2015, pp. 1-17.
Wojciech Zaremba et al., "Recurrent Neural Network Regularization", Under review as a conference paper at ICLR 2015, Feb. 19, 2015, pp. 1-8.

(56) References Cited

OTHER PUBLICATIONS

Hao Zhang et al., "Poseidon: A System Architecture for Efficient GPU-based Deep Learning on Multiple Machines", version 1, Dec. 19, 2015, pp. 1-14. https://arxiv.org/abs/1512.06216.
Martin A. Zinkevich et al., "Parallelized Stochastic Gradient Descent", NIPS'10 Proceedings of the 23rd International Conference on Neural Information Processing Systems—vol. 2, Dec. 6-9, 2010, pp. 2595-2603 https://dl.acm.org/citation.cfm?id=2997185.
Hao Chen et al., "The realization of the convolutional neural network on GPU", Sciencepaper Online (http://www.paper.edu.cn), Jan. 12, 2016.
"Talk about Batch_Size in deep learning", retrieved from http://blog.csdn.net/ycheng_sjtu/article/details/49804041, Nov. 12, 2015.
Corresponding China office action dated Mar. 10, 2021.

\* cited by examiner

TRAINING TASK OPTIMIZATION SYSTEM, TRAINING TASK OPTIMIZATION METHOD AND NON-TRANSITORY COMPUTER READABLE MEDIUM FOR OPERATING THE SAME

CROSS-REFERENCE TO RELATED APPLICATION

This application claims priority to U.S. Provisional Application Ser. No. 62/517,189, filed on Jun. 9, 2017, which is herein incorporated by reference.

BACKGROUND

Technical Field

Present disclosure relates to a computation system, a computation method and a non-transitory computer readable medium for computation. More particularly, present disclosure relates to a system, a method, and a non-transitory computer readable medium for training task optimization.

Description of Related Art

In recent years, neural networks and deep architecture have been proved effective in various application areas, such as computer vision, speech recognition, and machine translation. However, if a training task with large-scale data is performed without considering a tradeoff between computation speed and system constraints, the operating efficiency of training tasks may be reduced.

SUMMARY

Some aspects of the disclosure provide a training task optimization system. The training task optimization system comprises a processor. The processor is configured to receive training environment information of a training task. The training environment information at least carries information corresponding to training samples in the training task. The processor is configured to calculate a memory distribution for the training task based on memory factors, the training samples and a neural network. The processor is configured to determine a mini-batch size that is fit to the memory distribution. In response to the training environment information, the processor is configured to output the mini-batch size for execution of the training task.

Other aspects of present disclosure are to provide a training task optimization method. The training task optimization method is executed by a processor. The training task optimization method comprises following steps: receiving training environment information of a training task, wherein the training environment information at least carries information corresponding to training samples in the training task; calculating a memory distribution for the training task based on memory factors, the training samples and a neural network; determining a mini-batch sizes that is fit to the memory distribution; and in response to the training environment information, outputting the mini-batch size for execution of the training task.

Yet other aspects of present disclosure are to provide a non-transitory computer readable medium for training task optimization. The non-transitory computer readable medium contains program instructions for causing a processor to perform the method as follows: receiving training environment information of a training task, wherein the training environment information at least carries information corresponding to training samples in the training task; calculating a memory distribution for the training task based on memory factors, the training samples and a neural network; determining a mini-batch size that is fit to the memory distribution; and in response to the training environment information, outputting the mini-batch size for execution of the training task.

It is to be understood that both the foregoing general description and the following detailed description are by examples, and are intended to provide further explanation of the invention as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Figure 1:
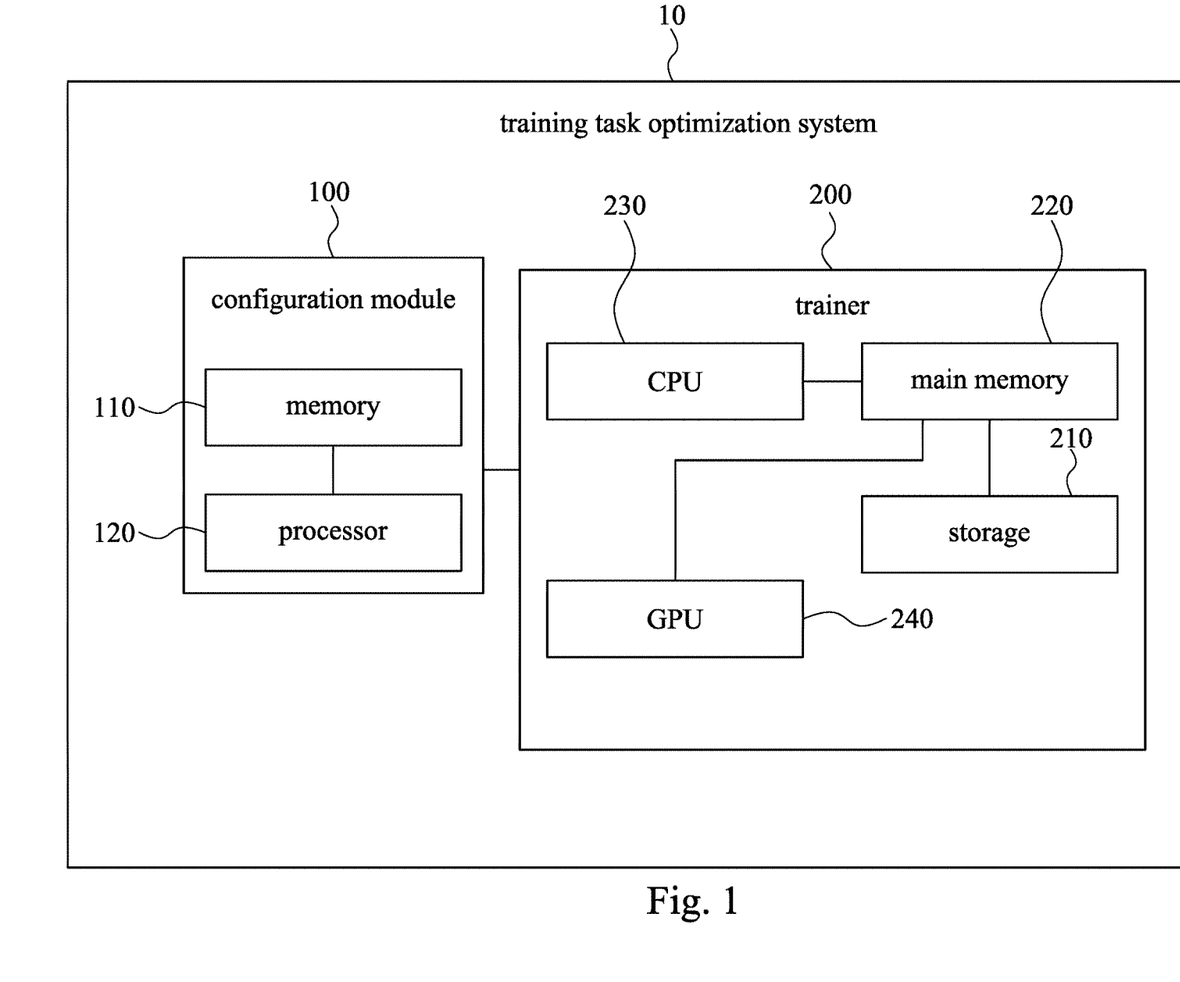
FIG. 1 is a schematic diagram of a training task optimization system according to some embodiments of the present disclosure.

FIG. 1 is a schematic diagram of a training task optimization system according to some embodiments of the present disclosure. As shown in FIG. 1, in the embodiment, a configuration module 100, for example, can be a cloud server or an individual computer at least including a memory 110 and a processor 120. The configuration module 100 is communicatively coupled to a trainer 200. It is noted that the term "communicatively coupling" used herein can be referred to as coupling in physically or non-physically manners. For example, in one case, the configuration module 100 and the trainer 200 can be coupled to a network via wireless communication (e.g. Wi-Fi) for bi-directional information exchange. In an alternative case, the configuration module 100 and the trainer 200 can be coupled to the network via cable, physically, for bi-directional information exchange. As shown in FIG. 1, the configuration module 100 and the trainer 200 in conjunction form a training task optimization system 10.

In some embodiments, the trainer 200 can be a computer or a combination of multiple computers (or processors) settled to execute a training task, such as deep learning processes for computer vision, speech recognition or machine translation. As shown in FIG. 1, in the embodiment, the trainer 200 is an individual computer includes storage 210, a main memory 220, a CPU (Central Processing Unit) 230, and a GPU (Graphics Processing Unit) 240. The storage 210, for example, can be a flash memory, a HDD (Hard Disk Drive) or a SSD (Solid State Disk). The main memory 220, for example, can be a DRAM (Dynamic Random Access Memory) or a SRAM (Static Random Access Memory). When an instance of the training task begins, the latest model parameters (weights) can be pulled from a shared memory (not shown) to the main memory 220. Then, a subset of the training samples can be loaded from the storage 210 to the main memory 220. The CPU 230 can perform a data preparation process to the subset of the training samples for format transformation and augmentation. The provided training samples can be sent to the GPU 240 for gradient descend computation. The updated model parameters generated by the gradient descend computation can be transferred to the main memory 220. The updated model parameters can be transmitted to the shared memory as a replacement of the lasted model parameters. When the model parameters are updated, the instance of the training task is completed. When all the instances of the training task are completed, the training task is done.

Figure 7:
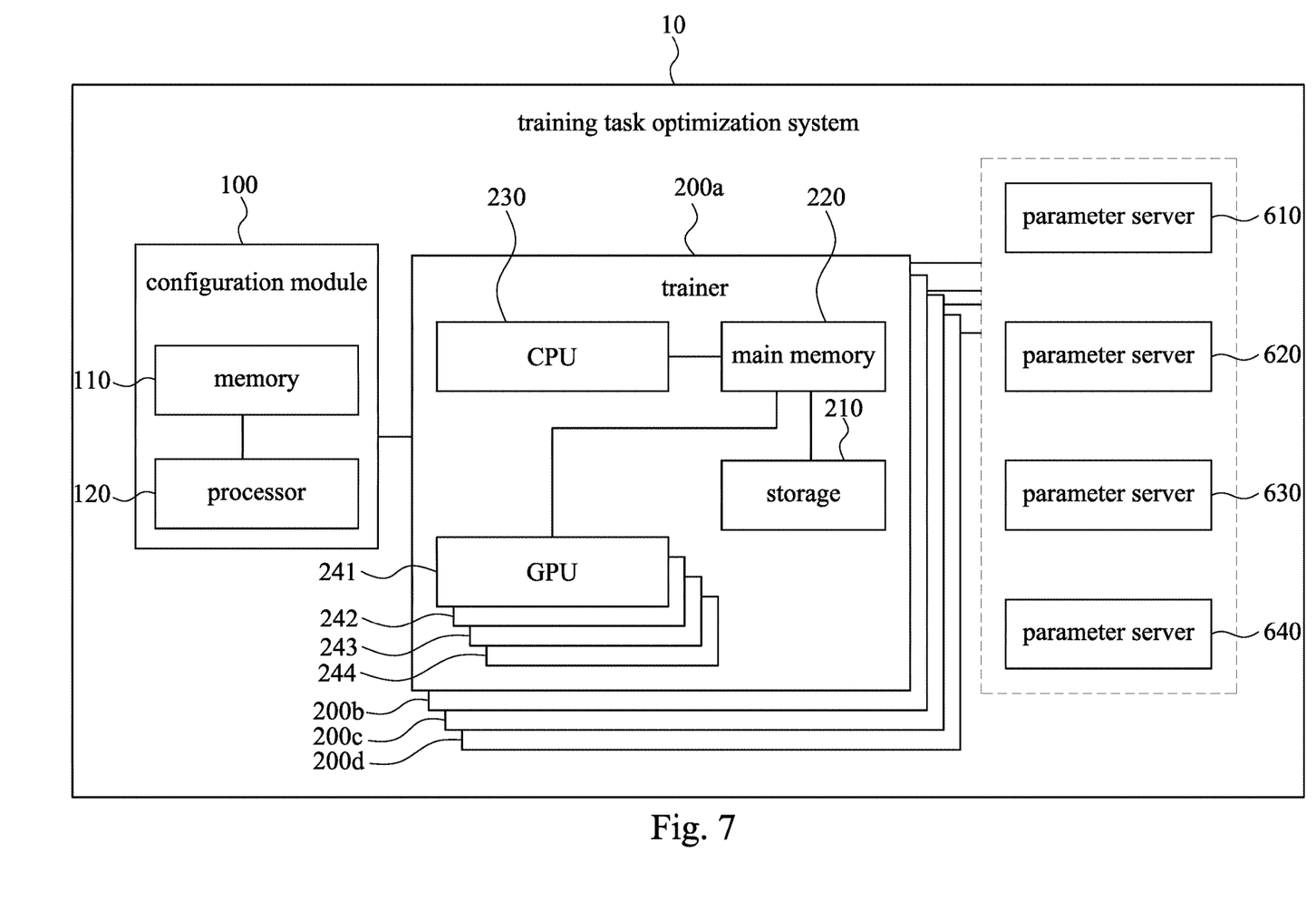
FIG. 7 is a schematic diagram of a training task optimization system according to some embodiments of the present disclosure.

It is noted that, in some embodiments, especially in a case with multiple trainers, the model parameters can be stored in one or more parameter servers (e.g. parameter servers shown in FIG. 7). These parameter servers can be several distributed cloud databases. In this case, when an instance of the training task begins, the latest model parameters can be pulled from the parameter servers to the main memory 220. Similarly, the instance of the training task can be done by updating new model parameters to the parameter servers.

It is noted that, in the embodiment, to achieve higher system accuracy, massive input data are required as samples in the training task. Usually, prior to execution of a training task, the trainer 200 can input training environment information to the configuration module of the training task optimization system 10. The training environment information is about factors (e.g., constraints, etc.) of the training task. For example, since the complexity of a neural network can influence the efficiency of the training task, said factors can include a determined neural network in the training task. Similarly, training models used in the training task and a number of available GPUs that can be applied in the training task can both be the factors as well. Memory factors, which are the capacities of the GPUs or CPUs available in the training task, can be one of the factors. As mentioned, in a case with multiple trainers, a plurality of parameter servers that can be employed and network bandwidths for data transmission can both be the factors in the training task. Moreover, sizes of the training samples can also be one of the factors in the training task. Mentioned factors are gathered as training environment information to the configuration module 100 for memory usage estimation of the training task. In order to reach a balance among available memories and other factors, a training task optimization method performed by the configuration module 100 can be provided.

In some embodiments, the memory 110 can be volatile memories (e.g. DRAM) or non-volatile memories (e.g. flash memory) having data stored therein. The data stored in the memory 110 record correspondences between a plurality of mini-batch sizes and computation efficiencies. Usually, the training samples of the training task can be fetched in several subsets, and each time a subset being fetched is a mini-batch. The mini-batch size herein refers to an amount of the training samples being fetched in one mini-batch. It is noted that the mini-batch size is significant to the convergences and the throughputs of the training task.

Figure 2:
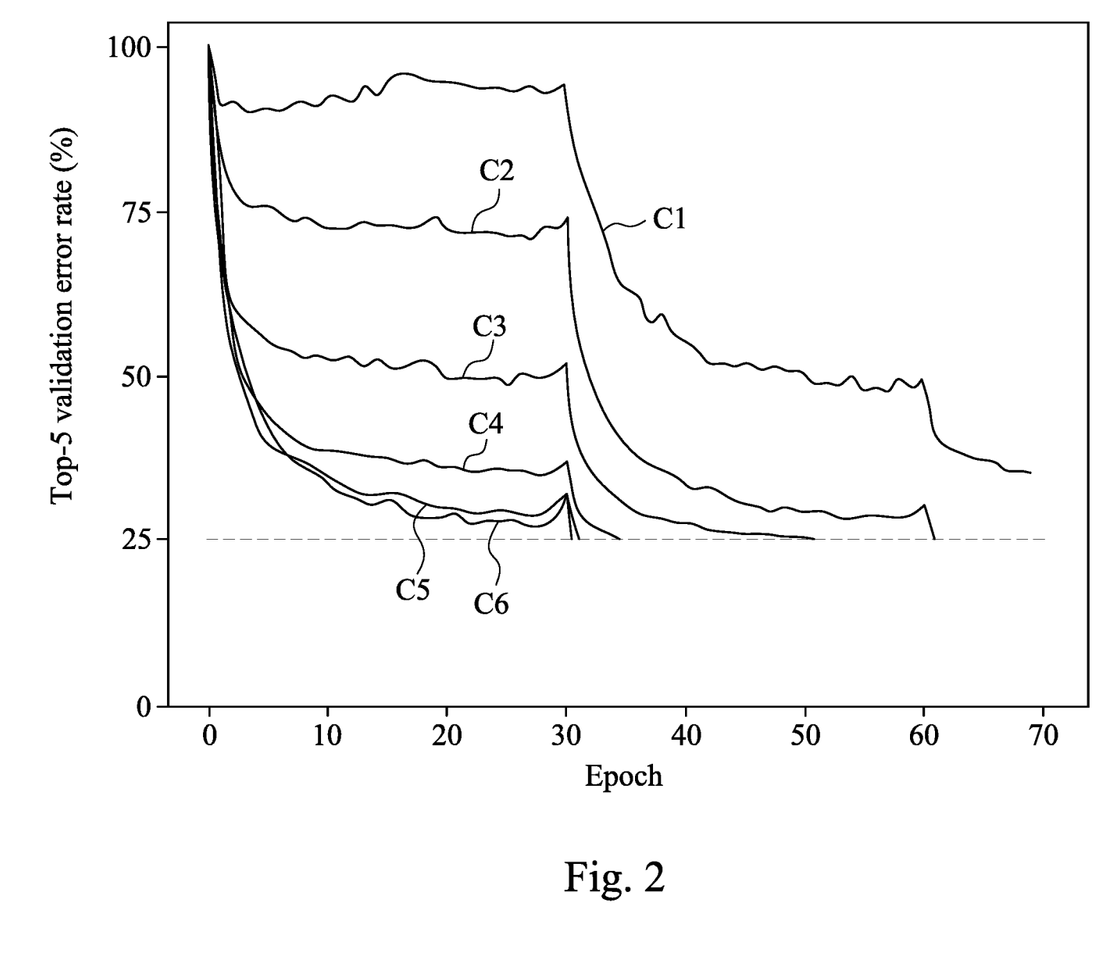
FIG. 2 is a schematic diagram showing learning convergence of systems associated with different mini-batch sizes according to some embodiments of the present disclosure.

For better understandings to the correspondences between mini-batch sizes and convergence, reference can be made to FIG. 2. FIG. 2 is a schematic diagram showing learning convergence of systems associated with different mini-batch sizes according to some embodiments of the present disclosure. The horizontal axis (x-axis) in FIG. 2 shows epochs of several learning processes, and the vertical axis (y-axis) in FIG. 2 shows top-5 validation errors of several learning processes. As shown in FIG. 2, a curve C1 represents learning convergence when the mini-batch size is 32, a curve C2 represents learning convergence when the mini-batch size is 64, a curve C3 represents learning convergence when the mini-batch size is 128, a curve C4 represents learning convergence when the mini-batch size is 256, a curve C5 represents learning convergence when the mini-batch size is 512, and a curve C6 represents learning convergence when the mini-batch size is 1024. The curve C5 and the curve C6 both reach 25% top-5 validation error at around 30th epochs. Apparently, according to FIG. 2, larger mini-batch size provides better convergences.

Figure 3:
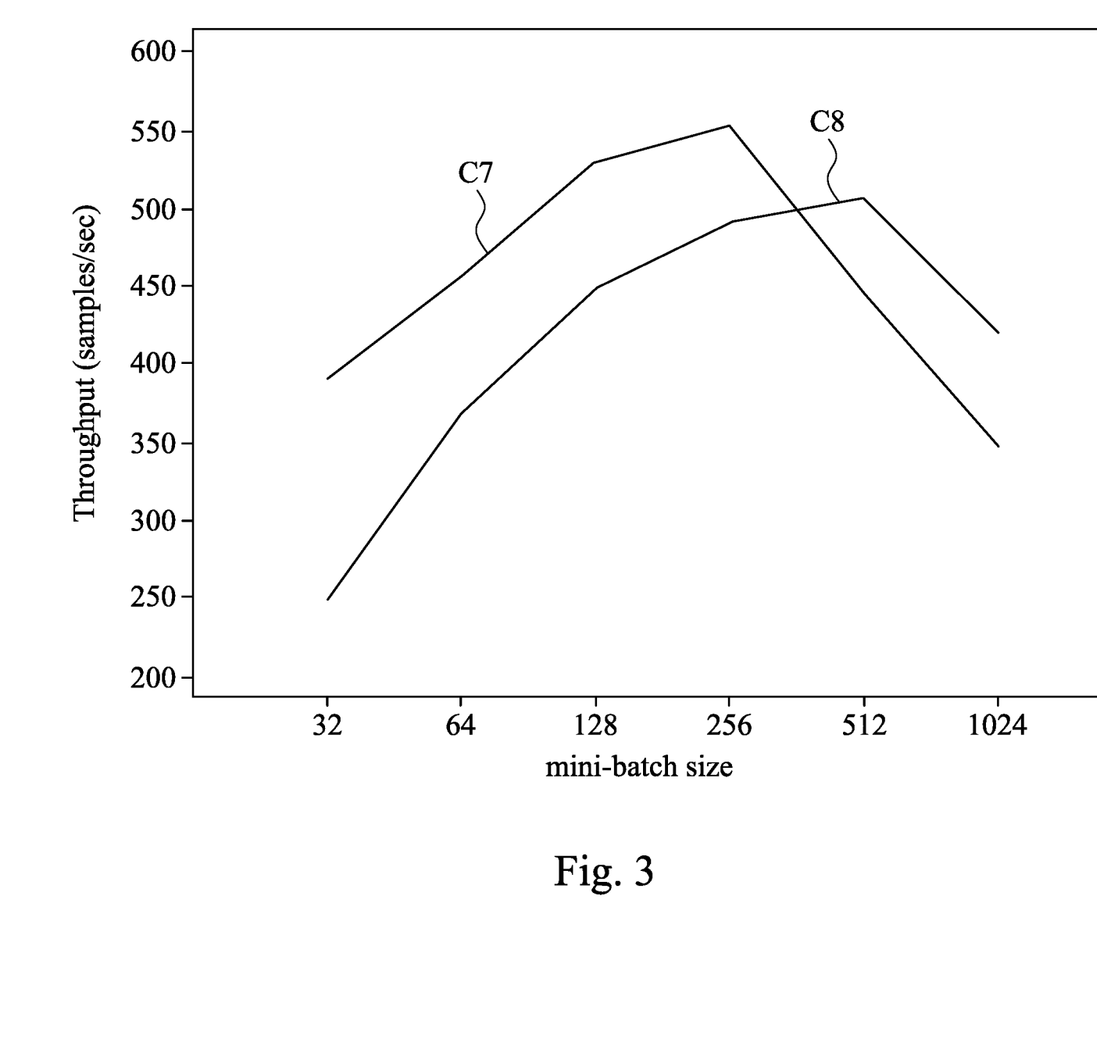
FIG. 3 is a schematic diagram showing system throughputs associated with different mini-batch sizes according to some embodiments of the present disclosure.

For better understandings to the correspondences between mini-batch sizes and computation efficiencies, reference can be made to FIG. 3 as well. FIG. 3 is a schematic diagram showing system throughputs associated with different mini-batch sizes according to some embodiments of the present disclosure. The horizontal axis (x-axis) in FIG. 3 shows mini-batch size of the learning processes, and the vertical axis (y-axis) in FIG. 3 shows throughputs of the learning processes. As shown in FIG. 3, a curve C7 represents system throughputs of a learning process performed under MXNet deep learning framework and a curve C8 represents system throughputs of a learning process performed under TensorFlow deep learning framework. Apparently, according to FIG. 3, larger mini-batch sizes do not always reflect better system throughputs. When mini-batch size exceeds a threshold, system throughput drops. The threshold under MXNet framework is 256, and threshold under TensorFlow framework is 512 in this example. However, it is noted that the thresholds herein are for illustration purpose, various thresholds can be applied in other embodiments.

According to FIG. 2 and FIG. 3, larger mini-batch size means not always a good choice. A decent mini-batch size can be found when the correspondences between mini-batch sizes and computation efficiencies/convergences shown in FIG. 2 and FIG. 3 are both considered. It is noted that the data stored in the memory 110 includes information regarding the correspondence charts shown in FIG. 2 and FIG. 3.

In some embodiments, the processor 120 includes, for example but not limited to, a single processing circuit and a combination of plurality micro processing circuits electrically connected to internal memories or external memories. The internal or external memories include volatile and non-volatile memories. The processor 120 is configured to fetch program instructions from these internal or external memories, to execute the program instructions, and to perform said training task optimization method according to these program instructions. For better understandings, details of the training task optimization method will be explained in following paragraphs.

Figure 4:
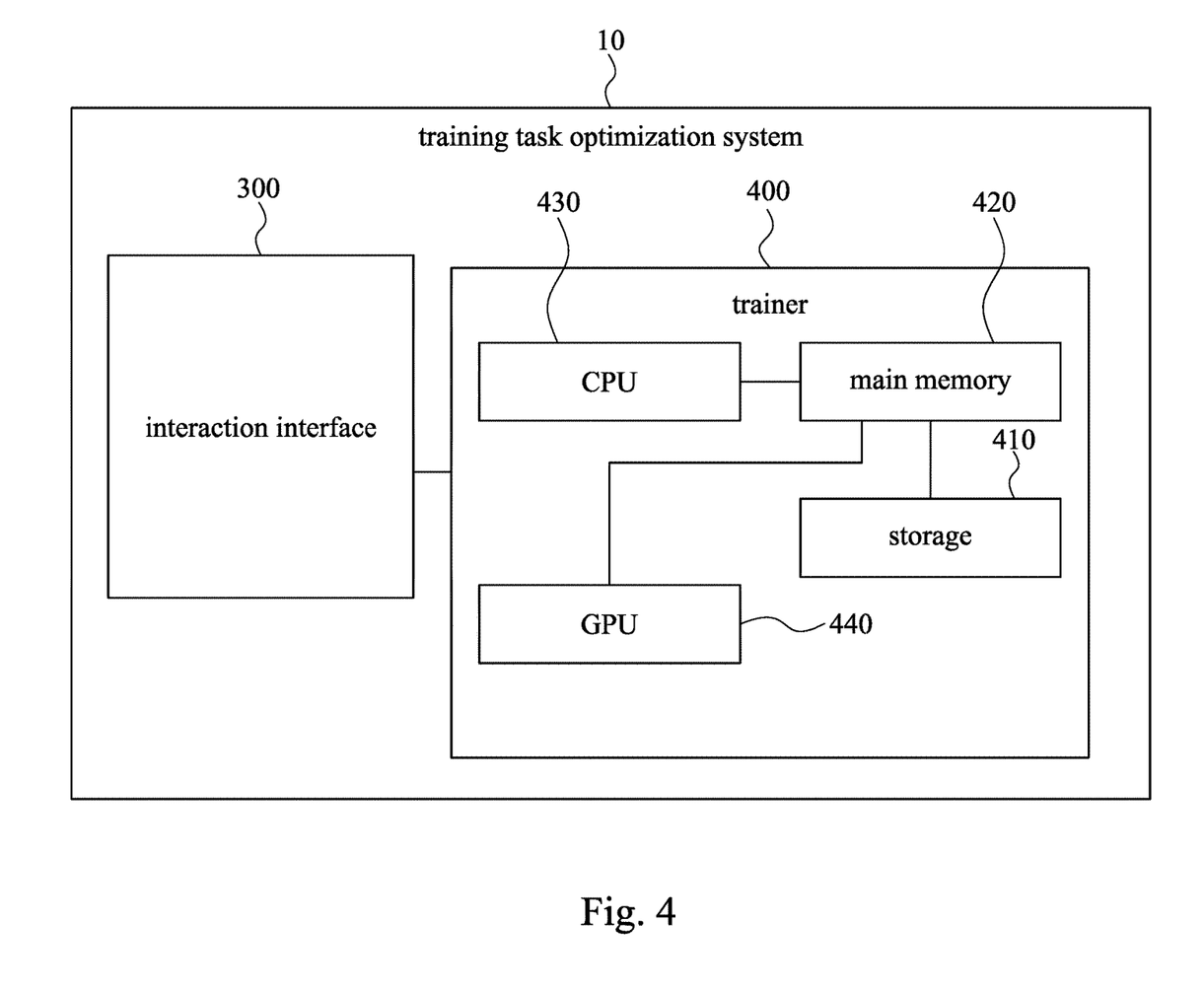
FIG. 4 is a schematic diagram of a training task optimization system according to some embodiments of the present disclosure.

FIG. 4 is a schematic diagram of a training task optimization system according to some embodiments of the present disclosure. As shown in FIG. 4, in the embodiment, the training task optimization system 10 includes an interaction interface 300 and a trainer 400 (or further including an external server). The interaction interface 300 and the trainer 400 can be implemented as an individual computer. The interaction interface 300 can be, for example, a touch display, keyboard, mouse, or combination thereof, configured to associate with the trainer 400. As shown in FIG. 4, in the embodiment, the trainer 400, for example, can be a task processing core including storage 410, a main memory 420, a CPU 430, and a GPU 440. It is noted that the components of the trainer 400 can be implemented by hardware similar to the trainer 200 shown in the embodiment of FIG. 1. Moreover, steps for an instance of the training task being performed by the trainer 400 can be similar to the one done by the trainer 200 shown in the embodiment of FIG. 1. In this manner, references can be directed to the embodiment of FIG. 1.

It is noted that, in some embodiment, a user can access the trainer 400 via the interaction interface 300. The training task optimization system 10 can perform an application (or a webpage service) for memory usage estimation. Similar to the embodiment of FIG. 1, in the embodiment, the user can input the training environment information to the application (or the external server for the webpage service) via the interaction interface 300, wherein the training environment information carries factors of the training task (which will be performed by the trainer 400). Contents of the training environment information of the training task can be referred to the embodiment of FIG. 1. In some embodiments, when the application (or the webpage service) is performed by the training task optimization system 10 (by the trainer 400), the application (or the webpage service) can check GPUs, CPU and/or memory factors of the trainer 400 automatically. In this case, the user can submit training environment information (e.g. neural network, models or parameter servers in use) those has not been checked via the interaction interface 300. In some cases, the application (or the webpage service) can provide options regarding candidate neural networks or candidate models to the training task optimization system 10. The interaction interface 300 can display these options.

The user can select favorable neural network or model to be used in the training task from these options. In this way, the application (or the webpage service) can still obtain required training environment information of the trainer 400 for memory usage estimation.

Figure 5:
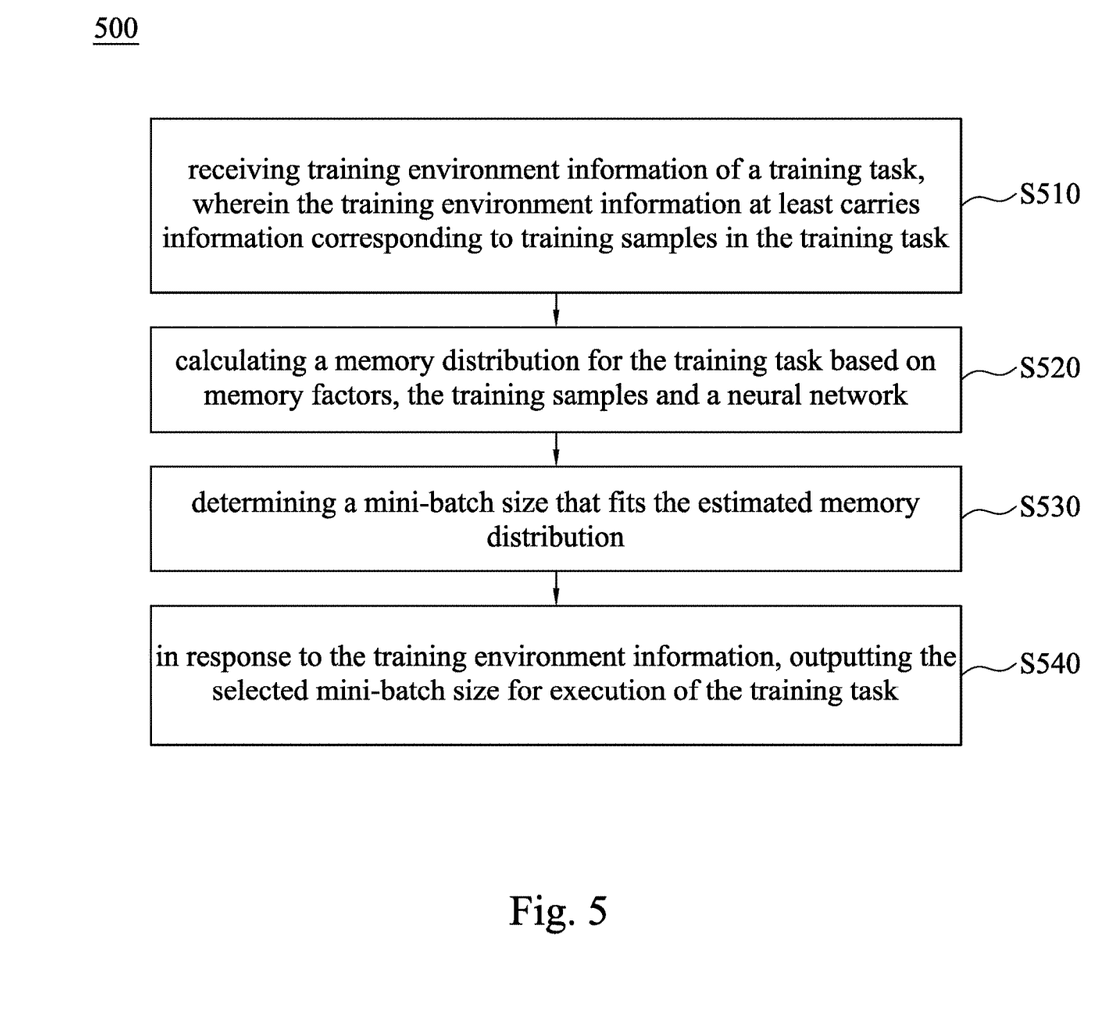
FIG. 5 is a flow chart of a training task optimization method according to some embodiments of the present disclosure.

FIG. 5 is a flow chart of a training task optimization method according to some embodiments of the present disclosure. In some embodiments, a training task optimization method 500 can be executed by the processor 120 of the configuration module 100 shown in FIG. 1. In some embodiments, the training task optimization method 500 can be executed by the association of the training task optimization system 10 shown in FIG. 4. In some embodiments, some program instructions are stored in a non-transitory computer readable medium (e.g. the memory 110). The execution of the training task optimization method 500 is performed via the program instructions. In some embodiments, detail steps of the training task optimization method 500 are described in following paragraphs.

In step S510: receiving training environment information of a training task, wherein the training environment information at least carries information corresponding to training samples in the training task.

In some embodiments, the trainer 200 is going to perform a training task for image recognition. Before the training task is performed, the trainer 200 can submit the training environment information of the training task to the configuration module 100. The training environment information carries information corresponding to the memory factors of the trainer 200, the training samples of the training task, and the neural network used in the training task. According to the embodiment of FIG. 1, memory factors of the trainer 200 can be memory capacities of the memory of the GPU 240. In some embodiments, the training samples of the training task can be a plurality of colorful images having specific sizes. And, the neural network which will be used in the training task can be a convolution neural network consists of two major stages, a feature extraction stage and a classification stage. The feature extraction stage can include several convolution layers and several pooling layers, and the classification stage can include several fully-connected layers. As mentioned, the trainer 200 can transmit the collected training environment information to the configuration module 100 of the training task optimization system 10. In this way, the training environment information can be stored in the memory 110 and accessible to the processor 120.

In the embodiment of FIG. 4, when the application (or the webpage service) is performed by the trainer 400 of the training task optimization system 10, the application (or the webpage service) can check GPUs, CPU and/or memory factors of the trainer 400 automatically. And, the application (or the webpage service) can provide options regarding candidate neural networks or candidate models to the training task optimization system 10. The user can select favorable neural network or model to be used in the training task via the interaction interface 300. Then, the user can submit the training samples of the training task to the application (or the webpage service). In this case, the application (or the webpage service) performed by the trainer 400 can still obtain the sizes of the training samples, the memory factors of the trainer 400, and the neural network (model) to be used in training task.

In step S520: calculating a memory distribution for the training task based on memory factors, the training samples and a neural network.

In the embodiment of FIG. 1, in order to calculate an available memory space for the trainer 200, the processor 120 can access the training environment information sent from the memory 110. As mentioned, the training samples of the training task can be images having specific sizes. The processor 120 can calculate a first required space that represents spaces provided for the training samples associated with different mini-batch sizes and required spaces for output data corresponding to each of the layers. More specifically, in order to obtain an optimal mini-batch size for the training task, the processor 120 can set target mini-batch size as an unknown value.

In some embodiments, the processor 120 can calculate a memory usage allocated to the training samples and output data in the feature extraction stage. For instance, if a size of the training samples can be obtained by a multiplication of image width and height, the memory usage of the training samples can be calculated by a multiplication of the size of the training samples, color channels (RGB) of the training samples and the target mini-batch size. It is noted that the memory usage can be calculated in each layer of the feature extraction stage. As mentioned, since the layers in the feature extraction stage are already obtained, the memory usages in all layers of the feature extraction stage can be aggregated as the first required space. Generally, the first required space considers both the training samples and output data (i.e. feature maps).

In some embodiments, the processor 120 can calculate a memory usage that represents spaces allocated to the model parameters and gradients in the feature extraction stage. As mentioned, since the layers in the feature extraction stage are already obtained, the processor 120 can obtain sizes and numbers of filters in the feature extraction stage. Therefore, the processor 120 can calculate the memory usage of the model parameters (weights). Since a number of the gradients being calculated in the gradient descend computation is corresponding to the number of the model parameters, memory usage of the gradients in the feature extraction stage can be calculated as the same memory usage of the model parameters. Moreover, if the model is configured with a bias, the memory usage of the bias can be calculated similarly.

In some embodiments, the processor 120 can calculate a memory usage that represents spaces allocated to the classification stage. As mentioned, since the full-connected layers in the classification stage are already obtained, the processor 120 can obtain number of neurons and model parameters in the classification stage. According to the number of neurons in each layer of the classification stage, the memory usage of output data in the classification stage can be calculated. According to the number of neurons in each pair of connected layers, the memory usage of model parameters in the classification stage can be calculated. Similarly, since a number of the gradients being calculated in the gradient descend computation is corresponding to the number of the model parameters, memory usage of the gradients in the classification stage can be calculated as well. Moreover, if the model is configured with a bias, the memory usage of the bias can be calculated similarly.

Accordingly, in some embodiments, the processor 120 can aggregate the memory usages of the model parameters, the memory usages of the gradients, the memory usages of the bias in both the feature extraction stage and the classification stage as a second required space.

It is noted that each layer of the neural network is performed according to an algorithm. Different algorithms have different time consumptions and require different sizes of temporary buffer. For example, convolution computation with GEMM (General Matrix Multiplication) based algorithms can be slow but requires less memory space, and FFT (Fast Fourier Transform) based algorithms can be fast, relatively, but requires more memory space. In this case, to provide an effective training system, a trade-off between speed and memory can be considered. The processor 120 can list combinations of the algorithm candidates in all the layers in the training task and calculate required temporary buffers for each combination. In some embodiments, the processor 120 can aggregate the temporary buffers prepared for all the algorithms in these layers as a third required space.

In some embodiments, according to the obtained memory distribution, including the memory factors, the memory usage of the feature extraction stage and the memory usage of the classification stage, the processor 120 can perform a deduction computation to estimate an available memory space in the training task. The available memory space represents the maximum memory usage saved for the required temporary buffers for each combination of candidate algorithm. It is noted that the available memory space can be represented as a polynomial of the target mini-batch size. It is to say, in foregoing embodiments, the available memory space can be calculated by deducting the first required space and the second required space from the memory factors (i.e. the memory constraints of GPUs). Since the memory factors are fixed, in order to obtain an available memory distribution, a value of the third required space should be determined as smaller than the available memory space. Therefore, once the available memory space is obtained by the processor 120, it can be used to determine which algorithm combination (corresponding to the third required space) is available.

It is noted that, in the embodiment of FIG. 4, the step S520 can be performed by the trainer 400 (associated with the application) in a similar manner as above. Depending on the user's selections for the neural network and the model in use, calculations for the memory usages corresponding to the neural network and the model may be different. However, the way that the memory usages being calculated is substantially the same.

In step S530: determining a mini-batch size that fits the estimated memory distribution.

In the embodiment of FIG. 1, according to the estimated available memory space and required memory spaces for each combination of algorithm candidates, the processor 120 can perform a heuristic computation to obtain the target mini-batch size. It is noted that the heuristic computation can be performed according to the correspondences between mini-batch sizes and computation efficiencies. The processor 120 can access the data indicating correspondences between mini-batch sizes and computation efficiencies from the memory 110, and try the mini-batch sizes with a descending order (or ascending order) in the heuristic computation.

As shown in FIG. 2 and FIG. 3, in some embodiments, the mini-batch size of 512 or 256 outperforms the mini-batch size of 1024 on system throughputs. Therefore, in some embodiments, the processor 120 can first try 512 as the target mini-batch size in the heuristic computation according to the correspondences between mini-batch sizes and computation efficiencies. If the 512 mini-batch size does not fit the estimated available memory space, the processor 120 can then try 256 as the target mini-batch size in the heuristic computation. The processor 120 can perform the heuristic computation repeatedly until a decent target mini-batch size fit to the heuristic computation is found.

In some embodiments, the processor 120 can try the mini-batch sizes with an ascending order in the heuristic computation. The processor 120 can try the target mini-batch size of 32, 64, 128, 256, 512, and 1024 with the ascending order in the heuristic computation. For example, if the 32 mini-batch size is fit to the estimated available memory space, the processor 120 then tries 64 as the target mini-batch size in the heuristic computation. The processor 120 can perform the heuristic computation repeatedly until a maximum mini-batch size fit to the estimated available memory is found.

Moreover, according to target mini-batch size, the processor 120 can select one algorithm from the algorithm candidates for each layer of the neural network so as to optimize the trade-off between speed and memory. For example, in the heuristic computation, if a mini-batch size of 512 is fit to the estimated available memory space under a specific combination of algorithm candidates. The processor 120 can select the target mini-batch size as 512 and select the specific combination as an optimal algorithm combination for the training task. It is to say, the processor 120 is aimed at finding an optimal algorithm combination and an optimal mini-batch size simultaneously under the memory factors.

It is noted that, in the embodiment of FIG. 4, the step S530 can be performed by the trainer 400 (associated with the application) in a similar manner as above. The user can access the trainer 400, via the interaction interface 300, to try the heuristic computation with multiple mini-batch sizes, until an efficient mini-batch size that fits the memory factors is selected and a combination of algorithms is determined. The heuristic computation and the algorithm selection are performed in similar ways as above.

In step S540: in response to the training environment information, outputting the selected mini-batch size for execution of the training task.

In the embodiment of FIG. 1, in response to the training environment information sent from the trainer 200, the processor 120 can output an optimization result to the trainer 200, in which the optimization result includes the selected mini-batch size and the selected algorithm combination for the neural network. In this case, the trainer 200 can perform the training task according to the selected mini-batch size and the selected algorithms for each layer.

In the embodiment of FIG. 4, once the trainer 400 (associated with the application) select the mini-batch size available under the memory factors and select the decent algorithm combination, the trainer 400 can perform the training task according to the selected mini-batch size and the selected algorithms for each layer. In some cases, the interaction interface 300 can present an advice corresponding to the optimization result. For instance, the interaction interface 300 (e.g. monitor) can display the selected mini-batch size and the selected algorithm combination for the neural network under the given memory factors. The displayed information can be referenced before (or when) the training task is executed.

Figure 6:
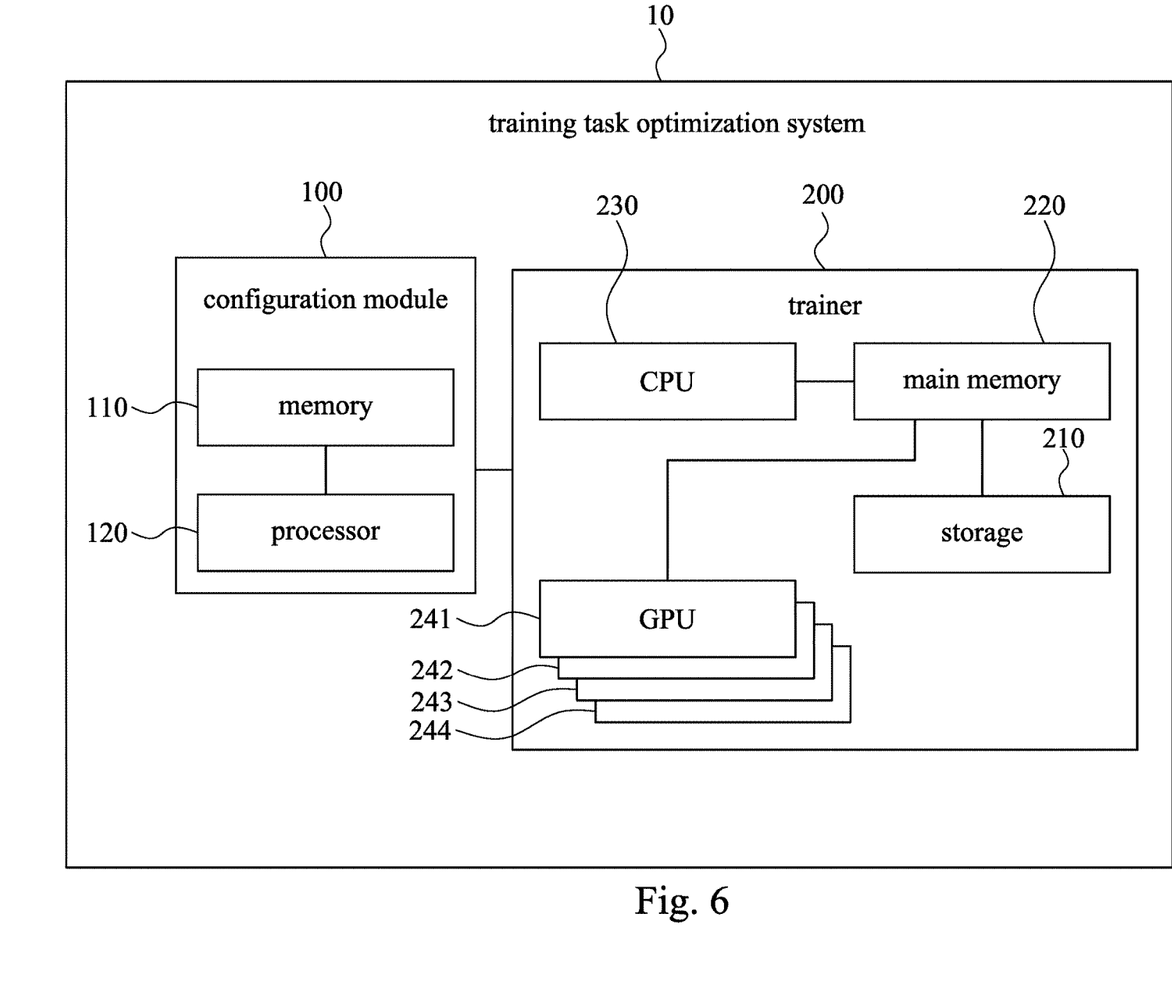
FIG. 6 is a schematic diagram of a training task optimization system according to some embodiments of the present disclosure.

FIG. 6 is a schematic diagram of a training task optimization system according to some embodiments of the present disclosure. As shown in FIG. 6, similar to the embodiment of FIG. 1, a training task optimization system 10 includes the configuration module 100 and the trainer 200. The configuration module 100 includes the memory 110 and the processor 120.

However, in the embodiment, the trainer 200 is a computer includes the storage 210, the main memory 220, the CPU 230, and a plurality of GPUs 241-244. In this case, in order to expedite the training tasks, the provided training samples can be distributed to the GPUs 241-244 for gradient descend computations in parallel. It is noted that, in this embodiment, each of the GPUs 241-244 is assumed to be the same as the GPU 240 in the embodiment of FIG. 1.

In order to achieve a decent efficiency with extra GPUs, in the embodiment of FIG. 6, the training environment information being sent to the configuration module 100 further includes information regarding number of the GPUs 241-244, overhead times (time for data transfer) of the GPUs 241-244, efficiencies of the GPUs 241-244, and an expected efficiency of the training task. In some embodiment, the expected efficiency of the training task is input by a user of the trainer 200. In this case, the processor 120 can generate a GPU employment advice for the trainer 200 according to training environment information, such that the expected efficiency can be achieved.

For example, when the target mini-batch size is determined, the processor 120 can estimate the computation time of the GPUs 241-244 according to the efficiencies of the GPUs 241-244. Given the expected efficiency of the training task, the processor 120 can determine how many GPUs can be employed in the training task according to the computation time of the GPUs 241-244 and overhead times of the GPUs 241-244. The number of the GPUs 241-244 to be employed can be calculated according to following equation:

$$\alpha = (1+R_o)/(1+G*R_o).$$

It is noted that the above equation is derived from Amdahl's law. $\alpha$ represents the expected efficiency of the training task. It is assumed that a full computation speed of the trainer 200 can be achieved when all the GPUs 241-244 are employed in the training task. It this case, $\alpha$ can be ranged from 0% to 100%. 100% efficiency means the maximum speed that the trainer 200 can achieve. $R_o$ is a quotient of the overhead times of the GPU 241 and the computation time of the GPU 241. G represents a minimum number of GPUs to be employed in the training task to achieve the expected efficiency.

According to the above equation, the processor 120 can determine a number of the GPUs 241-244 to be employed in the training task that satisfies the given expected efficiency (i.e. given $\alpha$ in the equation). When the processor 120 obtain the number of the GPUs 241-244 to be employed in the training task, the processor 120 can generate the GPU employment advice for the trainer 200 according to that number. When the GPU employment advice is sent to the trainer 200, the trainer 200 can perform the training task according to the GPU employment advice such that the expected efficiency can be achieved with least GPUs.

Similar to the embodiment of FIG. 4, in some embodiments, the trainer 200 can be associated with an application (or a webpage service). According to a computation with the same equation as above and the expected efficiency, the trainer 200 can generate the GPU employment advice by itself. Then, the trainer 200 can perform the training task according to the GPU employment advice in order to achieve the expected efficiency.

FIG. 7 is a schematic diagram of a training task optimization system according to some embodiments of the present disclosure. As shown in FIG. 7, similar to the embodiment of FIG. 1, the training task optimization system 10 includes the configuration module 100 and a plurality of trainers 200a-200d. The configuration module 100 includes the memory 110 and the processor 120. In the embodiment, the configuration module 100 is coupled to the plurality of trainers 200a-200d.

In the embodiment, the trainer 200a can be a computer includes the storage 210, the main memory 220, the CPU

230, and the GPUs 241-244. It is noted that the configurations of the trainers 200a-200d are substantially identical with each other so the others will not be repeated here again. As shown in the figure, the trainers 200a-200d are associated with a plurality of parameter servers 610-640. In order to expedite the training task, the provided training samples can be distributed to the GPUs 241-244 for gradient descend computations in each of the trainers 200a-200d, and the model parameters can be distributed to the parameter servers 610-640. It is noted that, the term "distributed" here may refer to that the model parameters being divided into the parameter servers 610-640, or each of the parameter servers 610-640 being stored with a copy of the model parameters. In this case, each time the trainers 200a-200d initialize an instance of the training task, the trainers 200a-200d can load the lasted model parameters from some of the parameter servers 610-640 in parallel. And, each time the trainers 200a-200d complete the instance of the training task, the trainers 200a-200d can distribute the updated model parameters to some of the parameter servers 610-640 in parallel. Therefore, the efficiency of the training task can be improved.

In order to find out a number for the parameter servers to be used, in the embodiment, the training environment information being sent to the configuration module 100 further includes information regarding number of the GPUs 241-244, number of the parameter servers 610-640, and a network bandwidth of parameter servers 610-640. In this case, in order to improve works of data distribution on the parameter servers 610-640, the processor 120 can generate a parameter server employment advice for each of the trainers 200a-200d according to training environment information. The number of the parameter servers 610-640 to be employed can be calculated according to following equation:

$$N_{ps} \geq (2S_p * N_w)/(B_{ps} * T_c), \text{ in which } N_{ps} \text{ is an integer.}$$

It is noted that, in this embodiment, each of the GPUs 241-244 is assumed to be the same as the GPU 240 in the embodiment of FIG. 1. Tc represents the GPU computation time of any of the GPUs 241-244. $S_p$ represents the size of the model parameters in the training task, which can be obtained from the neural network. $N_w$ represents a number of trainers (i.e. the trainers 200a-200d) being employed in the training task. Bps represents the network bandwidth of parameter servers. $N_{ps}$ represents a minimum number of parameter servers (i.e. the parameter servers 610-640) required in the training task.

According to the above equation, the processor 120 can determine a number of the parameter servers 610-640 to be employed in the training task. When the processor 120 obtain the number of the parameter servers 610-640 to be employed in the training task, the processor 120 can generate the parameter server employment advice for the trainers 200a-200d according to that number. When the parameter server employment advice is sent to each of the trainers 200a-200d, the trainers 200a-200d can perform the training task according to the parameter server employment advice. For example, the processor 120 can determine that the requirement can be reached with three parameter servers in the parallel structure. In this case, the processor 120 can select three parameter servers, for example, the parameter servers 610-630 to be employed for the training task. In this case, the model parameter can be distributed into the parameter servers 610-630. Thus, a higher efficiency can be achieved when the trainer 200 accesses the model parameters from the parameter servers 610-630 in parallel.

Similar to the embodiment of FIG. 4, in some embodiments, the trainers 200a-200d can be associated with applications (or the webpage services). According to a computation with the same factors as above, the trainers 200a-200d can generate the parameter server employment advice by itself. Then, the trainers 200a-200d can perform the training task according to the parameter server employment advice in order to achieve better system efficiency.

According to foregoing embodiments, a training task optimization system, a training task optimization method and a non-transitory computer readable medium for training task optimization are provided in present disclosure. The configuration module of the training task optimization system (or the trainer itself in some cases) can choose a decent mini-batch size for the training task when the system factors (e.g. memory constraints) and training requirements are given. Moreover, the configuration module (or the trainer) can select optimal algorithms for the neural network in operation. The configuration module (or the trainer) can also determine how many GPUs or parameter servers can be used in the training task to achieve better training efficiency.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A training task optimization system, comprising:
   a processor, configured to receive training environment information of a training task, wherein the training environment information carries information corresponding to training samples in the training task,
   wherein a neural network comprises a plurality of layers, and the processor is configured to calculate a first required space that represents spaces allocated to the training samples and output data corresponding to each of the plurality of layers,
   the processor is configured to obtain model parameters from the neural network and calculate a second required space that represents spaces allocated to the model parameters and gradients,
   the processor is configured to calculate an available memory space by deducting the first required space and the second required space from memory factors,
   each of the layers corresponds to a plurality of algorithm candidates,
   the processor is configured to calculate a third required space that represents buffers prepared for algorithms in the layers, and the third required space is smaller than the available memory space, thereby calculating, by the processor, a memory distribution for the training task,
   the processor is configured to determine a mini-batch size that is fit to the memory distribution, wherein the mini-batch size is an amount of the training samples being fetched in one mini-batch,
   in response to the training environment information, the processor is configured to output the mini-batch size for execution of the training task, wherein the training task is executed according to the mini-batch size so as to optimize training efficiency.

2. The training task optimization system of claim 1, further comprising:
 a memory, configured to store data of correspondences between a plurality of mini-batch sizes and computation efficiencies, wherein the mini-batch size is selected from the memory based on the computation efficiencies.

3. The training task optimization system of claim 1, further comprising:
 an interaction interface, configured to input the training environment information, wherein the training environment information further carries information corresponding to the memory factors and the neural network.

4. The training task optimization system of claim 1, wherein the training environment information further carries information corresponding to a plurality of graphic processors provided for the training task and an expected efficiency, and
 the processor is configured to determine a number of the plurality of graphic processors to be employed based on the expected efficiency, and output the number of the graphic processors for execution of the training task.

5. The training task optimization system of claim 1, wherein the training environment information further carries information corresponding to a number of graphic processors provided for the training task and a plurality of parameter servers provided for the training task and a network bandwidth, and
 the processor is configured to determine a number of the plurality of parameter servers to be employed based on the number of graphic processors and the network bandwidth, and output the number of the parameter servers for execution of the training task.

6. A training task optimization method, executed by a processor, comprising:
 receiving training environment information of a training task, wherein the training environment information carries information corresponding training samples in the training task, wherein a neural network comprises a plurality of layers, each of the layers corresponds to a plurality of algorithm candidates;
 calculating a first required space that represents spaces allocated to the training samples and output data corresponding to each of the plurality of layers;
 obtaining model parameters from the neural network and calculating a second required space that represents spaces allocated to the model parameters and gradients;
 calculating an available memory space by deducting the first required space and the second required space from memory factors;
 calculating a third required space that represents buffers prepared for algorithms in the layers, and the third required space is smaller than the available memory space, thereby calculating a memory distribution for the training task;
 determining a mini-batch size that is fit to the memory distribution, wherein the mini-batch size is an amount of the training samples being fetched in one mini-batch; and
 in response to the training environment information, outputting the mini-batch size for execution of the training task, wherein the training task is executed according to the mini-batch size so as to optimize training efficiency.

7. The training task optimization method of claim 6, further comprising:
 retrieving correspondences between a plurality of mini-batch sizes and computation efficiencies, wherein the mini-batch size is selected based on the computation efficiencies.

8. The training task optimization method of claim 6, wherein the training environment information further carries information corresponding to a plurality of graphic processors provided for the training task and an expected efficiency, and the training task optimization method further comprising:
 determining a number of the plurality of graphic processors to be employed based on the expected efficiency; and
 outputting the number of the plurality of graphic processors for execution of the training task.

9. The training task optimization method of claim 6, wherein the training environment information further carries information corresponding to a number of graphic processors provided for the training task, a plurality of parameter servers provided for the training task and a network bandwidth, and the training task optimization method further comprising:
 determining a number of the plurality of parameter servers to be employed based on the number of graphic processors and the network bandwidth; and
 outputting the number of the plurality of parameter servers for execution of the training task.

10. A non-transitory computer readable medium for training task optimization, and the non-transitory computer readable medium containing program instructions for causing a processor to perform a method of:
 receiving training environment information of a training task, wherein the training environment information carries information corresponding to training samples in the training task, wherein a neural network comprises a plurality of layers, each of the layers corresponds to a plurality of algorithm candidates;
 calculating a first required space that represents spaces allocated to the training samples and output data corresponding to each of the plurality of layers;
 obtaining model parameters from the neural network and calculating a second required space that represents spaces allocated to the model parameters and gradients;
 calculating an available memory space by deducting the first required space and the second required space from memory factors;
 calculating a third required space that represents buffers prepared for algorithms in the layers, and the third required space is smaller than the available memory space, thereby calculating a memory distribution for the training task;
 determining a mini-batch sizes that is fit to the memory distribution, wherein the mini-batch size is an amount of the training samples being fetched in one mini-batch; and
 in response to the training environment information, outputting the mini-batch size for execution of the training task, wherein the training task is executed according to the mini-batch size so as to optimize training efficiency.

* * * * *